(12) United States Patent
Kondo

(10) Patent No.: US 8,363,275 B2
(45) Date of Patent: Jan. 29, 2013

(54) PRINT CONTROLLER CONFIGURED TO SUPPRESS BLEED

(75) Inventor: Masaki Kondo, Toyoake (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 331 days.

(21) Appl. No.: 12/692,970

(22) Filed: Jan. 25, 2010

(65) Prior Publication Data

US 2010/0195161 A1  Aug. 5, 2010

(30) Foreign Application Priority Data

Jan. 30, 2009  (JP) ................................. 2009-019280

(51) Int. Cl.
*H04N 1/60* (2006.01)
(52) U.S. Cl. ........ 358/1.9; 358/2.1; 358/3.24; 358/3.26; 358/3.27; 358/518; 358/529
(58) Field of Classification Search .................. 358/1.9, 358/3.26–3.27, 517–536
See application file for complete search history.

(56) References Cited

U.S. PATENT DOCUMENTS

| | | | | |
|---|---|---|---|---|
| 5,428,377 A * | 6/1995 | Stoffel et al. | ................... | 347/15 |
| 5,630,026 A * | 5/1997 | Ogletree et al. | ............... | 358/1.7 |
| 5,975,678 A | 11/1999 | Kanematsu et al. | | |
| 5,992,971 A * | 11/1999 | Takahashi et al. | ............... | 347/43 |
| 6,084,604 A * | 7/2000 | Moriyama et al. | ............... | 347/15 |
| 6,116,720 A | 9/2000 | Inui et al. | | |
| 6,118,548 A * | 9/2000 | Ryan | ............................. | 358/1.9 |
| 6,233,061 B1 * | 5/2001 | Huang et al. | ................... | 358/1.9 |
| 6,312,102 B1 * | 11/2001 | Moriyama et al. | ............... | 347/43 |
| 6,445,463 B1 * | 9/2002 | Klassen | .......................... | 358/1.9 |
| 6,731,821 B1 * | 5/2004 | Maurer et al. | ................. | 382/263 |
| 6,975,428 B1 * | 12/2005 | Ernst et al. | ..................... | 358/1.9 |
| 7,286,263 B2 * | 10/2007 | Ogasawara et al. | ............ | 358/1.9 |

(Continued)

FOREIGN PATENT DOCUMENTS

| EP | 0 583 127 A2 | 2/1994 |
|---|---|---|
| EP | 1 191 784 A1 | 3/2002 |

(Continued)

OTHER PUBLICATIONS

Extended European Search Report dated Nov. 2, 2011 from related European Application No. 10152074.0.

(Continued)

*Primary Examiner* — Richard Zhu
(74) *Attorney, Agent, or Firm* — Scully, Scott, Murphy & Presser, P.C.

(57) ABSTRACT

A print controller controls a print process in which black ink having permeability to a recording medium and chromatic color ink having permeability to the recording medium different from the permeability of the black ink are used to form an image on the recording medium. The subject pixel setting unit sets, as a subject pixel, one pixel that satisfies a first condition that the pixel is a black pixel, a second condition that a plurality of peripheral pixels that are located adjacent to the pixel and that surround the pixel include at least one chromatic pixel, and a third condition that gradation level of black changes discontinuously between the pixel and at least one of the at least one chromatic pixel. The bleed suppressing unit executes a bleed suppression process to a set of pixel data corresponding to the subject pixel to suppress bleeding of the black ink on the recording medium.

9 Claims, 8 Drawing Sheets

U.S. PATENT DOCUMENTS

| | | | | |
|---|---|---|---|---|
| 7,564,604 | B2 * | 7/2009 | Shirasawa | 358/529 |
| 2003/0063301 | A1 * | 4/2003 | Klassen | 358/1.9 |
| 2004/0001211 | A1 | 1/2004 | Ogasawara et al. | |
| 2005/0140997 | A1 * | 6/2005 | Shirasawa | 358/1.9 |
| 2005/0141001 | A1 * | 6/2005 | Watanabe | 358/1.9 |
| 2005/0231742 | A1 * | 10/2005 | Hirano | 358/1.9 |
| 2007/0223044 | A1 | 9/2007 | Bailey et al. | |

FOREIGN PATENT DOCUMENTS

| | | |
|---|---|---|
| JP | 6-113155 | 4/1994 |
| JP | 6-152898 | 5/1994 |
| JP | H06-206370 | 7/1994 |
| JP | 7-125407 | 5/1995 |
| JP | H07-117330 | 5/1995 |
| JP | H7-125408 | 5/1995 |
| JP | H07-125409 | 5/1995 |
| JP | H08-118685 | 5/1996 |
| JP | H10-86503 | 4/1998 |
| JP | 2000-255084 | 9/2000 |
| JP | 2003-220717 | 8/2003 |
| JP | 2004-25785 | 1/2004 |
| JP | 2007-320118 | 12/2007 |

OTHER PUBLICATIONS

Extended European Search Report dated Nov. 3, 2011 from related European Application No. 10152080.7 and U.S. Appl. No. 12/692,973.

Japanese Official Action dated Nov. 9, 2010 together with an English language translation.

Japanese Official Action dated Oct. 19, 2010 together with an English language translation.

United States Office Action dated Mar. 1, 2012 received in related U.S. Appl. No. 12/692,973.

* cited by examiner

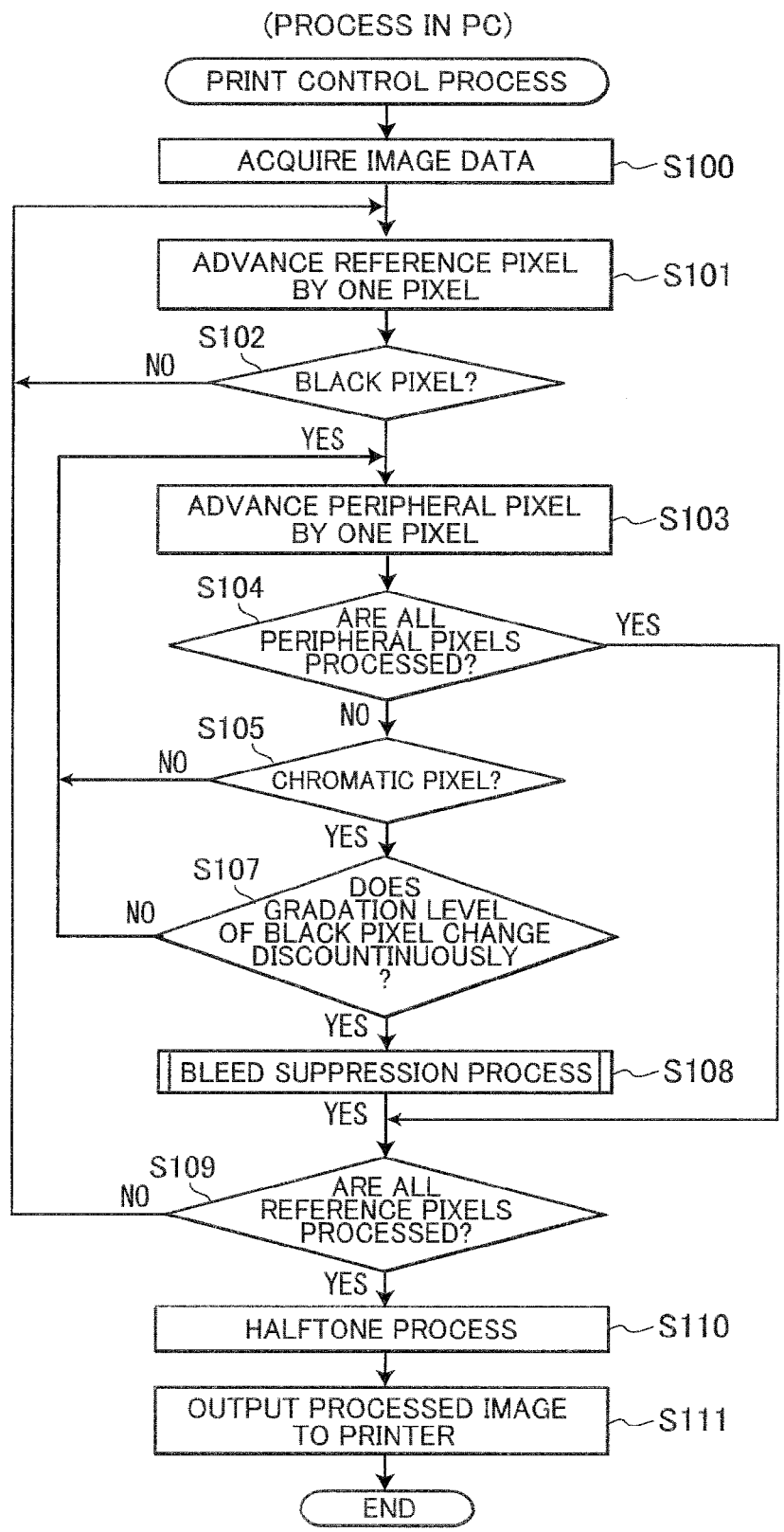

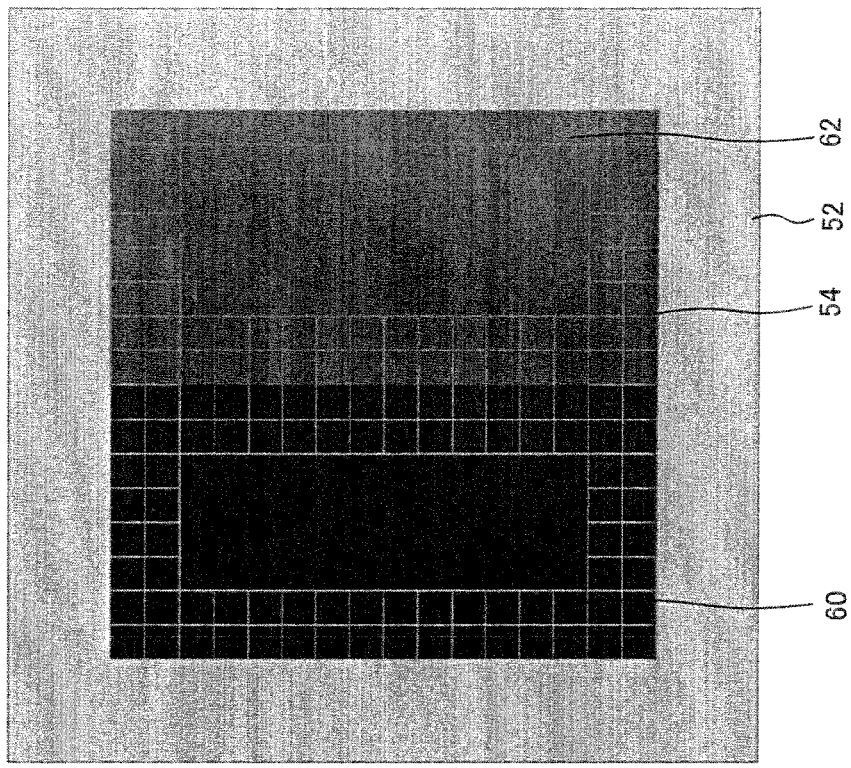
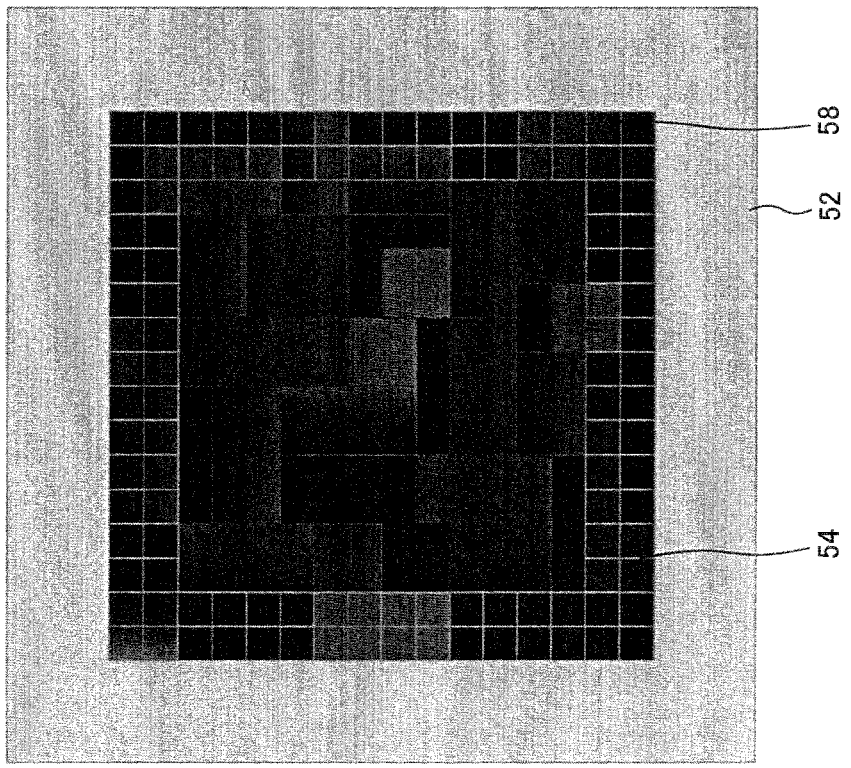

PRINT CONTROLLER CONFIGURED TO SUPPRESS BLEED

CROSS REFERENCE TO RELATED APPLICATION

This application claims priority from Japanese Patent Application No. 2009-019280 filed Jan. 30, 2009. The entire content of the priority application is incorporated herein by reference.

TECHNICAL FIELD

The invention relates to a print controller and a print control program.

BACKGROUND

An inkjet-type printing device well known in the art prints images by ejecting fine particles of ink in a plurality of colors, such as cyan, magenta, yellow, and black, to form dots on a recording medium.

Ink has a property called permeability that differs according to the type of ink. Permeability indicates the time required for the fine particles of ink to permeate and become fixed to the recording medium. For example, dye-based inks permeate a recording medium more readily than pigment inks Consequently, when particles of a black pigment ink are ejected onto a sheet of recording medium adjacent to particles of a dye-based color ink, the particles of color ink are first to permeate the medium, and the surface tension between the particles of black ink and the particles of color ink draws the black ink particles toward the color ink particles. Thus, the black ink bleeds into areas that are intended to have dots formed in color ink, potentially resulting in a degraded image quality.

To resolve this problem, a method was proposed to print black using ink in all the plurality of colors excluding black for pixels having a color pixel on the periphery thereof.

SUMMARY

It is an object of the invention to provide a print controller and a print control program capable of suppressing noticeable bleeding of black ink into chromatic ink while also suppressing a loss in black density.

In order to attain the above and other objects, the invention provides a print controller controlling a print process in which black ink having permeability to a recording medium and chromatic color ink having permeability to the recording medium different from the permeability of the black ink are used to form an image on the recording medium. The print controller includes an acquiring unit, a subject pixel setting unit, and a bleed suppressing unit. The acquiring unit acquires image data having a plurality of sets of pixel data, the image data representing an image including pixels. Each set of pixel data corresponds to one pixel and indicates a gradation level. The subject pixel setting unit sets, as a subject pixel, one pixel that is in the image and that satisfies a first condition that the pixel is a black pixel expressing black, a second condition that a plurality of peripheral pixels that are located adjacent to the pixel and that surround the pixel include at least one chromatic pixel expressing chromatic color, and a third condition that gradation level of black changes discontinuously between the pixel and at least one of the at least one chromatic pixel. The bleed suppressing unit executes a bleed suppression process to a set of pixel data corresponding to the subject pixel to suppress bleeding of the black ink on the recording medium.

According to another aspect, the invention provides a computer-readable storage medium storing a set of program instructions executable on a computer that controls a print process in which black ink having permeability to a recording medium and chromatic color ink having permeability to the recording medium different from the permeability of the black ink are used to faun an image on the recording medium. The program instructions includes: acquiring image data having a plurality of sets of pixel data, the image data representing an image including pixels, each set of pixel data corresponding to one pixel and including a gradation level; setting, as a subject pixel, one pixel that is in the image and that satisfies a first condition that the pixel is a black pixel expressing black, a second condition that a plurality of peripheral pixels that are located adjacent to the pixel and that surround the pixel include at least one chromatic pixel expressing chromatic color, and a third condition that the gradation level of black changes discontinuously between the pixel and at least one of the at least one chromatic pixel; and executing a bleed suppression process to a set of pixel data corresponding to the subject pixel to suppress bleeding of the black ink on the recording medium.

BRIEF DESCRIPTION OF THE DRAWINGS

The particular features and advantages of the invention as well as other objects will become apparent from the following description taken in connection with the accompanying drawings, in which:

FIG. 4 is a flowchart illustrating steps in the print control process executed on the PC;

FIG. 6(a) shows an example of nonuniform black elements including black pixels that are arranged on a background configured of solid chromatic elements;

FIG. 6(b) shows an example of two sets of solid dark black elements arranged adjacent to each other on a background configured of solid chromatic elements;

DETAILED DESCRIPTION

Figure 1:
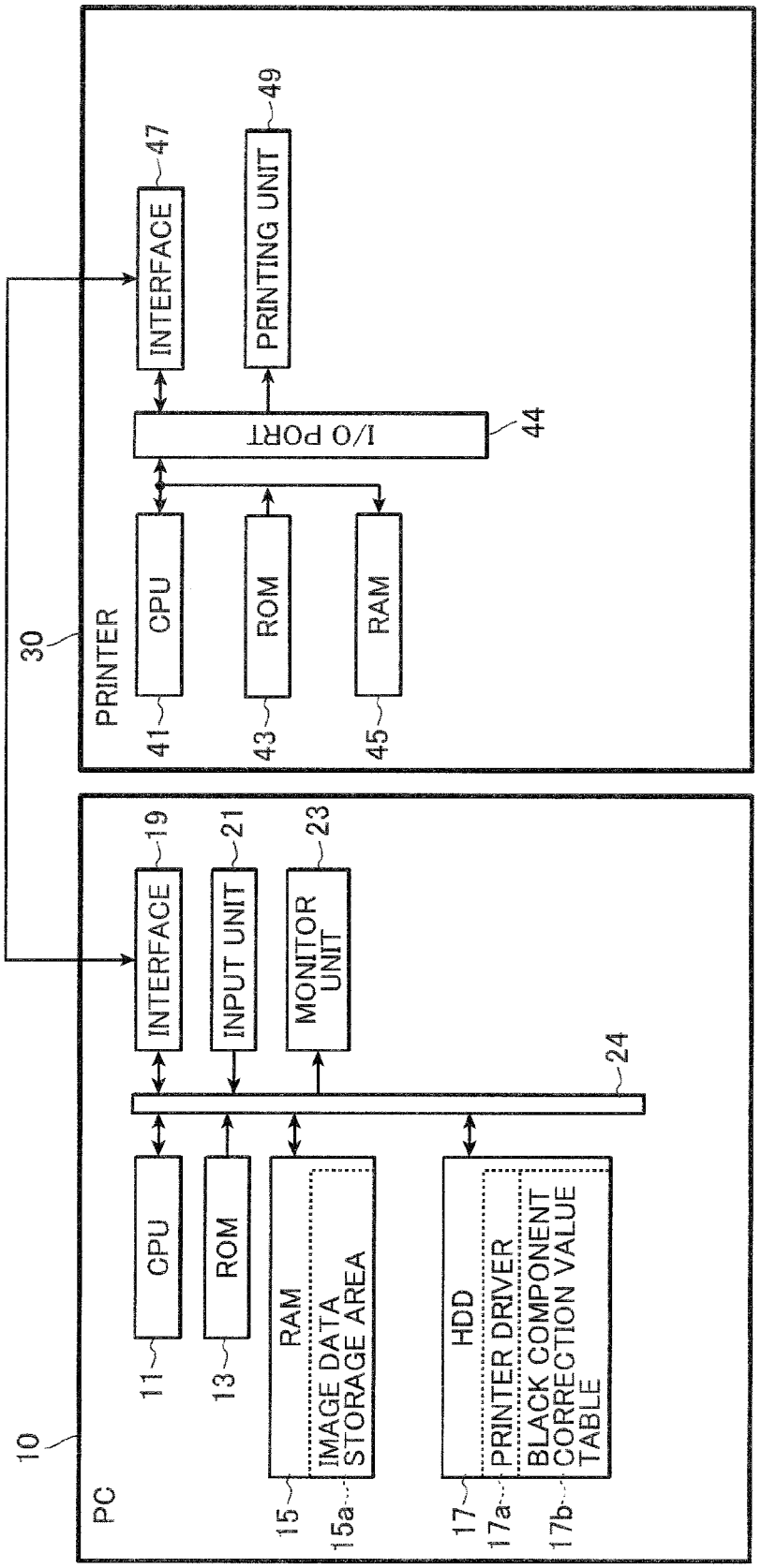
FIG. 1 is a block diagram showing an electrical structure of a PC and a printer connected to the PC according to an embodiment of the invention.

FIG. 1 is a block diagram showing an electrical structure of a PC 10 according to an embodiment of the invention, and a printer 40 that is connected to the PC 10. The PC 10 includes a CPU 11, a ROM 13, a RAM 15, a hard disk drive 17 (hereinafter abbreviated as "HDD 17"), an interface 19, an input device 21, and a monitor 23, all of which components are interconnected via a bus line 24. The PC 10 controls the printer 40 to print images. Specifically, the PC 10 of the embodiment controls the printer 40 to print images so that areas in which black ink bleeds into chromatic ink are virtually unnoticeable, while suppressing density loss in black regions.

The CPU 11 controls each component connected to the bus line 24 based on fixed values and programs stored in the ROM 13, RAM 15, and HDD 17. The ROM 13 is a memory device serving to store programs for controlling operations of the PC 10.

The RAM 15 is a read/write memory device for temporarily storing data required in processes performed by the CPU 11. The RAM 15 includes an image data storage area 15a for storing image data having a plurality of sets of pixel data. The image data represents an image including pixels arranged in a horizontal direction and a vertical direction. Each set of pixel data corresponds to one pixel. Each set of pixel data has a black component value K, cyan component value C, magenta component value M, and yellow component value Y. Here, the black component value K is a numerical value defined between 0 and 255, for example, expressing a gradation (shade) level of black, while the cyan component value C, magenta component value M, and yellow component value Y are numerical values defined between 0 and 255 expressing the gradation (shade) levels of cyan, magenta, and yellow, respectively. That is, each gradation level has a discrete value among 0 to 255, in the embodiment. In the embodiment, "chromatic components" is a collective term used to denote the cyan component value C, magenta component value M, and yellow component value Y. The image data can be obtained by performing a color conversion process known in the art on the original image data having R (red), G (green), and B (blue) brightness values each expressed as a value between 0 and 255. Since this process is well known in the art, a detailed description of the process will not be given herein.

The HDD 17 stores a printer driver 17a, which is a program for controlling the printer 40, and a black component correction value table 17b. The CPU 11 executes a print control process described later with reference to FIG. 4 based on the printer driver 17a. The black component correction value table 17b will also be described later with reference to FIG. 2. The PC 10 processes image data stored in the image data storage area 15a through the print control process of FIG. 4 and outputs this image data to the printer 40 via the interface 19, directing the printer 40 to print an image corresponding to the processed image data.

The input device 21 includes a keyboard and mouse, for example, with which the user can input instructions. The monitor 23 is a CRT display or a liquid crystal display, for example, and serves to visually render inputted data and details of various processes.

The printer 40 is an inkjet printer that includes a CPU 41 serving as a processor, a ROM 43 for storing various data and control programs executed by the CPU 41, a RAM 45 for storing image data and control signals received from the PC 10 connected to the printer 40, an I/O port 46, an interface 47, and a printing unit 49. The CPU 41, ROM 43, and RAM 45 are connected to the I/O port 46.

The I/O port 46 is also connected to the interface 47, and the printing unit 49. The printer 40 prints images on recording paper by ejecting black ink, cyan ink, magenta ink, and yellow ink onto the paper from nozzles provided in the printing unit 49 based on image data supplied from the PC 10 via the interface 47. In the embodiment, the black ink used in the printer 40 is pigment ink, while the cyan, magenta, and yellow inks used in the printer 40 are dye-based inks The pigment ink has a property called permeability and the dye-based inks have permeability different from the permeability of the pigment ink. Here, the permeability indicates the time required for the fine particles of ink to permeate and become fixed to the recording medium. Thus, when black ink is ejected at positions neighboring chromatic ink (i.e., cyan, magenta, or yellow ink), the black ink has a tendency to bleed into the chromatic ink. In order to suppress this bleeding problem, the PC 10 according to the embodiment executes a bleed suppression process for reducing the black component value K in pixels that meet a prescribed condition among the plurality of pixels constituting the image being processed.

Figure 2:
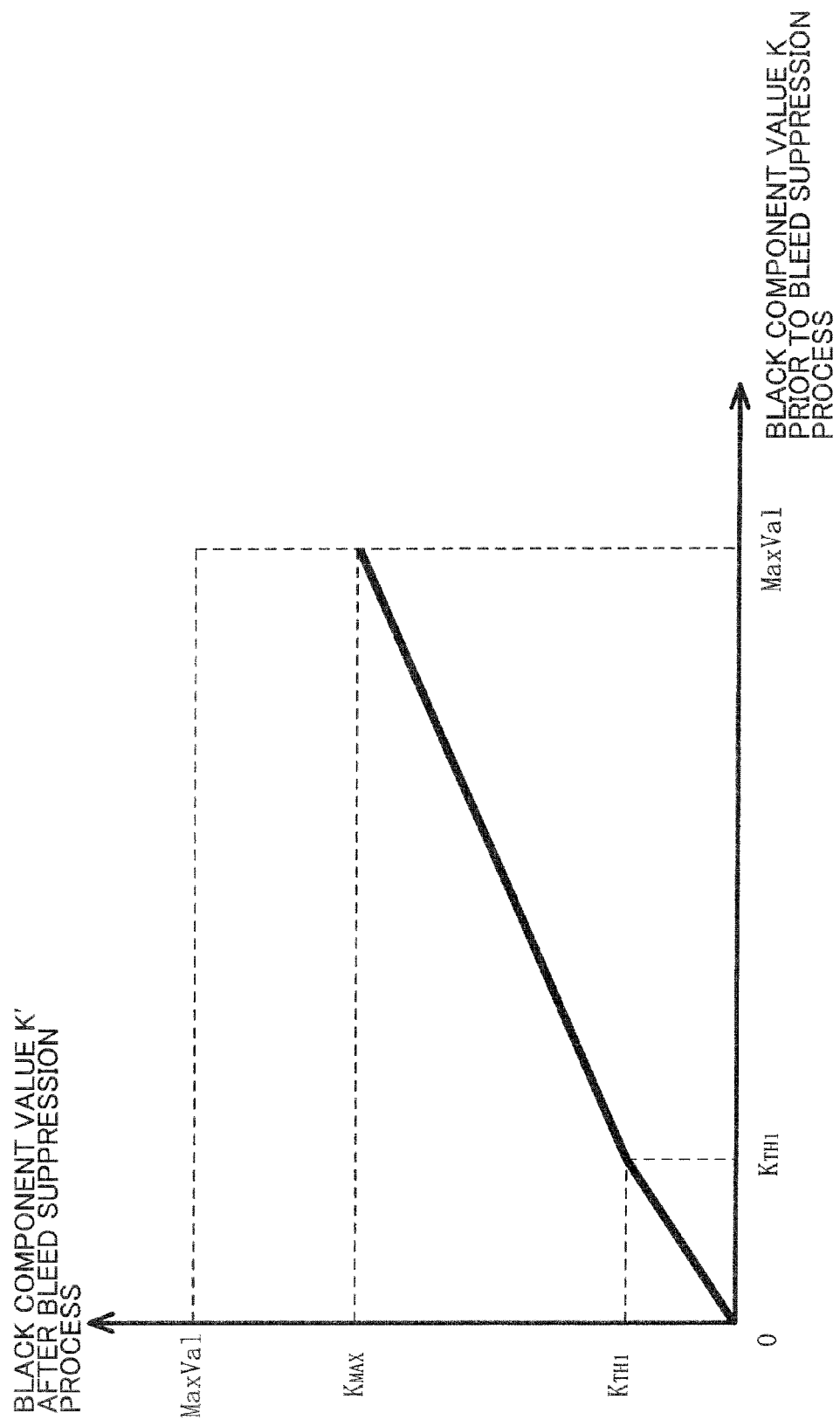
FIG. 2 is an explanatory diagram illustrating a relation between a black component value K prior to a bleed suppression process and a black component value K' after the bleed suppression process in a black component correction value table.

The graph in FIG. 2 shows the relationship specified in the black component correction value table 17b between the black component value K prior to the bleed suppression process and the black component value K' after the bleed suppression process. The PC 10 of the embodiment executes the bleed suppression process using this relationship defined in the black component correction value table 17b.

In the graph of FIG. 2, the horizontal axis represents the pre-processed black component value K (hereinafter simply referred to as "K") and the vertical axis represents the post-processed black component value K' (hereinafter simply referred to as "K'"). In order to suppress bleeding from pixels constituting the image being processed that meet a prescribed condition, the PC 10 of the embodiment reduces the black component value K of these pixels according to the relationship between K and K' specified in the black component correction value table 17b.

As shown in FIG. 2, K' equals K for values of K from 0 to $K_{TH1}$ based on the correlations specified in the black component correction value table 17b. In other words, the black component value K for a pixel is not reduced when the black component value K falls within this range because very little black is used to render this pixel. Since very little black is used, the problem of the black ink bleeding into neighboring colors is virtually unnoticeable and, hence, there is little need to reduce the black component value K in this case.

On the other hand, for all values of K greater than $K_{TH1}$, the relationship K>K' always holds true. When K is greater than $K_{TH1}$, the black component value K is reduced in the bleed suppression process.

The PC 10 executes a halftone process described later in S110 of FIG. 4 on the image data resulting from the bleed suppression process in order to binarize the color components of each pixel so that each set of pixel data has either an ON value or an OFF value for each component, where an ON value indicates that a dot is to be formed and an OFF value indicates that a dot is not to be formed. By reducing the black component value K to K' in target pixels, the PC 10 can reduce the probability of black dots occurring (i.e., the probability of black ink being printed) for pixels targeted in the process when the printer 40 prints the image, thereby suppressing the bleeding of black ink into chromatic ink.

In order to avoid a drop in black density caused by reducing the black component value K in the bleed suppression process of the embodiment, the PC 10 increases the values of the chromatic components for pixels whose black component value K is reduced. This process will be described later in greater detail with reference to FIGS. 7 and 8.

Equation (1) below shows the value of K' for all values of K greater than $K_{TH1}$.

$$K' = aK + b \quad (1)$$

Here, "a" and "b" is defined as follows, $$a = (K_{MAX} - K_{TH1})/(MaxVal - K_{TH1})$$

$$b = K_{MAX} - [(K_{MAX} - K_{TH1})/(MaxVal - K_{TH1}) \times MaxVal].$$

While the relationship between K and K' within the range $K > K_{TH1}$ is expressed by a monotonically increasing linear function, the slope of this function is smaller than that of the function representing the relationship between K and K' within the range $K \leq K_{TH1}$, and a maximum value $K_{MAX}$ of K' is smaller than a maximum possible value MaxVal of the black component value K (255 in the embodiment). The optimal values of $K_{TH1}$ and $K_{MAX}$ in the above equations may differ according to the type of recording paper being printed and can be determined experimentally. In the embodiment, $K_{TH1} = 64$ and $K_{MAX} = 140$.

The following facts can be extracted from the relationship between K and K' defined in the black component correction value table 17b shown in FIG. 2. First, the black component value K' that has been reduced in the bleed suppression process using the black component correction value table 17b is always greater than 0. Accordingly, the post-processed black component value K' can be converted to an ON dot in the halftone process. As a result, the PC 10 can better suppress a drop in black density in the printed image than when the use of black ink is completely restricted in order to suppress bleeding. While it is always possible to restrict all use of black ink and to render black using only a combination of chromatic ink colors, dark black is better rendered with black ink than a combination of chromatic ink colors.

Second, as the value of K in the targeted pixel increases, the value to which K is reduced in the bleed suppression process also increases. That is, the larger the value of K is, the larger the value of K' is obtained from the value of K through the bleed suppression process. In other words, the reduced black component value K' is always a larger value for larger values of the non-reduced black component value K. As a result, the probability of the reduced black component value K' being converted to an ON dot (i.e., the probability that a black dot will be formed) in the halftone process is greater for targeted pixels having a large black component value K prior to reduction, making it possible to render darker black.

Further, when an error diffusion algorithm is employed in the halftone process, differences between the values of K' and threshold values are distributed to peripheral pixels, thereby increasing the probability that a black component (K or K') will be converted to an ON dot for a peripheral pixel. Consequently, as the value of K in a target pixel increases, the occurrence of black dots also increases in a region of the recording paper corresponding to the target pixel and its periphery, making it possible to render a darker black.

Third, in the bleed suppression process using the black component correction value table 17b, the black component is reduced so that the difference between the black component value K prior to reduction and the black component value K' after reduction increases as the black component value K of the target pixel increases. In other words, the value of the black component value K is decreased by a larger margin for pixels having a large black component value K.

Next, the print control process of FIG. 4 executed by the CPU 11 of the PC 10 will be described, but first terminology and variables used in the process will be defined while referring to FIG. 3.

Figure 3:
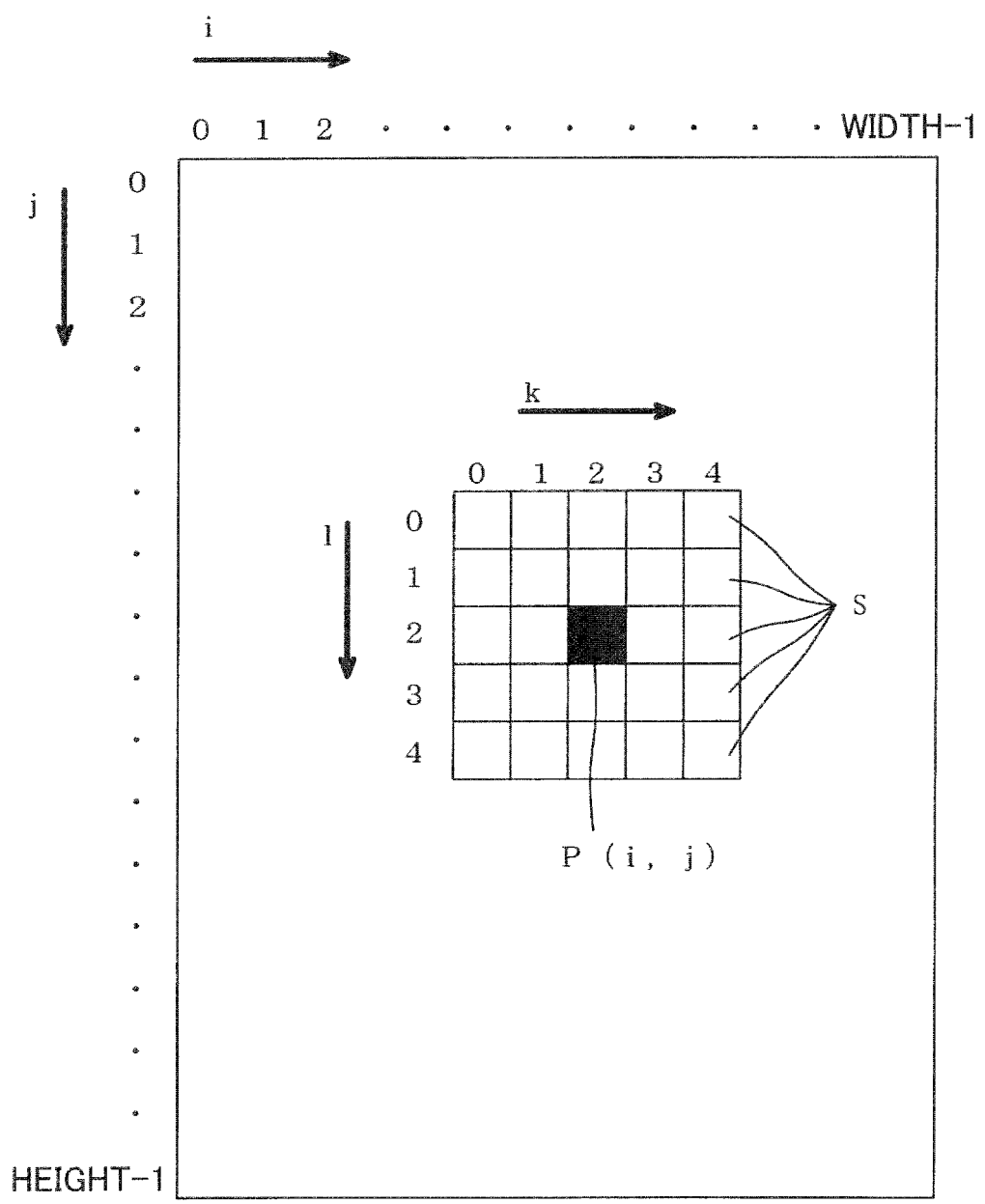
FIG. 3 conceptually illustrates an image being processed.

FIG. 3 conceptually illustrates an image being processed. Each pixel in this image is identified by a variable i denoting the pixel position in the width direction (horizontal direction in FIG. 3) and a variable j denoting the pixel position in the height direction (vertical direction in FIG. 3), where a point of origin (0, 0) is defined as the pixel located in the upper left corner. Thus, the notation P(i,j) will be used for identifying pixels in the following description of the print control process. Further, WIDTH will be used to indicate the width of the image being processed, and HEIGHT will be used to indicate the height of the image being processed. Accordingly, the range of possible values for variables i and j can be specified as $0 \leq i \leq \text{WIDTH} - 1$ and $0 \leq j \leq \text{HEIGHT} - 1$.

In the print control process of FIG. 4 described below, the CPU 11 references each of the plurality of pixels in the image one by one to determine whether the referenced pixel is a target pixel for the bleed suppression process.

Here, all pixels surrounding a reference pixel P(i,j) that are located within N pixels from the reference pixel P(i,j) in the width direction and within N pixels from the reference pixel P(i,j) in the height direction will collectively be referred to as peripheral pixels of the reference pixel P(i,j). In the embodiment, N=2. Thus, the 24 boxes surrounding the pixel P(i,j) in FIG. 3 represent peripheral pixels S of the reference pixel P(i,j). In other words, the peripheral pixels are located adjacent to the reference pixel P(i,j) and that surround the reference pixel P(i,j). Each peripheral pixel S is identified by a variable k representing the pixel position in the width direction, and a variable l representing the pixel position in the height direction, where the peripheral pixel S located in the upper left corner is the point of origin. Hence, the notation peripheral pixel S(k,l) is used to identify a peripheral pixel S in the following description. Since N=2 in the example shown in FIG. 3, the range of possible values for variables k and l can be expressed by $0 \leq k \leq 4$ and $0 \leq l \leq 4$.

FIG. 4 is a flowchart illustrating steps in the print control process executed on the PC 10. The CPU 11 of the PC 10 executes this process based on the printer driver 17a when the user inputs an instruction on the PC 10 to execute a printing operation.

In S100 of the print control process shown in FIG. 4, the CPU 11 acquires image data and stores this data in the image data storage area 15a (see FIG. 1).

In S101 the CPU 11 advances the pixel serving as the reference pixel P(i,j) by one pixel. Specifically, while i<(WIDTH−1)−N, the CPU 11 increments i by 1. However, when i=(WIDTH−1)−N, i is set to N and j is incremented by 1. At the beginning of the print control process when S101 is executed for the first time, the pixel P(N,N) is set as the reference pixel. As mentioned earlier, N=2 in this example.

In S102 the CPU 11 determines whether the reference pixel P(i,j) is a black pixel rendering black. Specifically, if the black component value K of the reference pixel P(i,j) is greater than or equal to a predetermined threshold $K_{TH1}$ (64, for example; S102: YES), the CPU 11 determines that the current pixel is a black pixel and advances to S103.

However, if the CPU 11 determines that the reference pixel P(i,j) is not a black pixel (S102: NO), the CPU 11 returns to S101 and advances the pixel serving as the reference pixel P(i,j) to the next pixel, since there is no need to perform the bleed suppression process in this case.

In S103 the CPU 11 advances the pixel serving as the peripheral pixel S(k,l) by one. Specifically, the CPU 11 increments k by 1 when k<2N (2×2=4, in the embodiment) and sets k to 0 and increments l by 1 when k=2N. When referencing peripheral pixel S(k,l) for the first time in S103 for the current reference pixel P(i,j), the CPU 11 sets the peripheral pixel to S(0,0).

In S104 the CPU 11 determines whether all peripheral pixels have been processed. The CPU 11 determines that all peripheral pixels have been processed (S104: YES) when the variable k=0 and the variable l=5. Subsequently, the CPU 11 advances to S109.

On the other hand, if the CPU 11 reaches a negative determination in S104 (S104: NO), in S105 the CPU 11 determines whether the peripheral pixel S(k,l) is a chromatic pixel expressing a chromatic color. Specifically, the CPU 11 determines that the peripheral pixel S(k,l) is a chromatic pixel when the sum of the cyan component value C [S(k,l)_C], the magenta component value M [S(k,l)_M], and the yellow component value Y [S(k,l)_Y] for the peripheral pixel S(k,l) currently being referenced (i.e., the total value [S(k,l)_C]+[S(k,l)_M]+[S(k,l)_Y]) is greater than or equal to a predetermined threshold value CMY (64, for example) and determines that the peripheral pixel S(k,l) is not a chromatic pixel when the sum is less than the threshold value CMY. In the determination of S105, the sum being compared to the threshold CMY may be calculated by applying a larger weight to chromatic color components that are more adversely affected by the bleeding of black ink, such as the yellow component.

When the CPU 11 determines that the peripheral pixel S(k,l) is not a chromatic pixel (S105: NO), there is no need to perform the bleed suppression process on the reference pixel P(i,j) with respect to the relationship between the peripheral pixel S(k,l) and the reference pixel P(i,j). Accordingly, the CPU 11 returns to S103 and advances the pixel serving as the peripheral pixel S to the next pixel.

However, when the CPU 11 determines that the peripheral pixel S(k,l) is a chromatic pixel (S105: YES), in S107 the CPU 11 determines whether the gradation level of black changes discontinuously between the reference pixel P(i,j) and the peripheral pixel S(k,l). The CPU 11 determines that the gradation level of black is discontinuous when the absolute value of the difference between the black component of the reference pixel P(i,j)[P(i,j)_K] and the black component in the peripheral pixel S(k,l) [S(k,l)_K] (i.e., |[P(i,j)_K]−[S(k,l)_K]|) is greater than or equal to a predetermine threshold $K_{TH2}$ (64, for example). If the CPU 11 determines that the gradation level of black changes discontinuously (S107: YES), the CPU 11 advances to the bleed suppression process in S108. Through the process of S107, the CPU 11 can appropriately determine whether the position of the peripheral pixel S(k,l) relative to the reference pixel P(i,j) is such that bleeding will be problematic (in other words, whether the reference pixel P(i,j) and peripheral pixel S(k,l) are separate pixels having different gradation levels of black). The bleed suppression process of S108 will be described later with reference to FIGS. 7 and 8.

However, if the gradation level of black does not change discontinuously between the reference pixel P(i,j) and the peripheral pixel S(k,l) (S107: NO), i.e., when the gradation level of black changes continuously or does not change between the reference pixel P(i,j) and the peripheral pixel S(k,l), there is no need to perform the bleed suppression process on this reference pixel P(i,j) based on the relationship between the current peripheral pixel S(k,l) and the reference pixel P(i,j). Accordingly, the CPU 11 returns to S103 and advances the pixel serving as the peripheral pixel S to the next pixel.

If the CPU 11 determines in S104 that all peripheral pixels S have been processed after repeatedly performing the above process with no negative determinations in S107 (S104: YES) or after the CPU 11 executes the bleed suppression process of S108, in S109 the CPU 11 determines whether all reference pixels have been processed. If there remain reference pixels to be processed (S109: NO), the CPU 11 returns to S101 to advance the pixel serving as the reference pixel to the next pixel and repeats the above process. In this way, the CPU 11 sets reference pixels as target pixels for the bleed suppression process when two conditions are met: at least one of the peripheral pixels S surrounding the reference pixel P(i,j) determined to be a black pixel is a chromatic pixel (S105: YES) and the gradation level of black between the reference pixel P(i,j) and the peripheral pixel S changes discontinuously (S107: YES). In other words, the CPU 11 determines that the black pixel is a subject pixel for the bleed suppression process when the black pixel and at least one of the peripheral pixels S are positioned such that bleeding would be noticeable.

When a positive determination is made in S109 after repeatedly performing the above process (S109: YES), in S110 the CPU 11 binarizes or quantizes the value of each pixel in the image data by executing a halftone process on this data. The halftone process is executed using an error diffusion algorithm or other algorithm well known in the art and will not be described in detail herein. In S111 the CPU 11 outputs the processed image data to the printer 40. Accordingly, the printer 40 is instructed to perform a printing operation based on image data in which the black component value as well as the cyan, magenta, and yellow component values for target pixels have been adjusted.

Through the print control process of FIG. 4, the PC 10 can identify pixels that must undergo the bleed suppression process based on the results of determinations from S102 to S107. The type of pixels that are selected to undergo this bleed suppression process based on the print control process of FIG. 4 will be described next with reference to FIGS. 5 and 6.

First, the CPU 11 of the PC 10 determines in the print control process whether the positional relationship between the reference pixel P and the peripheral pixel S is likely to result in noticeable bleeding (i.e., whether the reference pixel P and the peripheral pixel S belong to separate pixels whose black gradation levels differ discontinuously) based on the difference between the black components K for these pixels prior to the halftone process. As a result, the PC 10 can appropriately determine pixels that are likely to cause bleeding problems and to set these pixels as target pixels for the bleed suppression process. In a conceivable case, where it is determined which pixels are more likely to cause bleeding problems based on image data that has already undergone the halftone process. In this conceivable case, it is more difficult to determine which pixels are more likely to cause bleeding problems because the values of each pixel in the image data have been converted to binary values indicated either an ON dot or an OFF dot, for example. Hence, it is difficult to determine whether the reference pixel P and peripheral pixel S belong to separate pixels whose black gradation levels differ discontinuously.

When the PC 10 determines that the reference pixel is a black pixel and that one of its peripheral pixels is a chromatic pixel, the PC 10 determines in the print control process whether the gradation level of black changes discontinuously between the reference pixel and the peripheral pixel determined to be a chromatic pixel. Accordingly, the PC 10 can perform an efficient process for setting target pixels for the bleed suppression process.

Pixels set as target pixels for the bleed suppression process in the print control process of FIG. 4 will be described here with reference to FIGS. 5(a), 5(b), 6(a) and 6(b). FIG. 5(a) shows an example of solid black elements 50 configured of black pixels having a uniform black component value K that are arranged on a background of solid chromatic elements 52. Since the pixels constituting the solid black elements 50 have the chromatic color component that is the same with the chromatic color component of the solid chromatic elements 52 forming the background, these pixels are both black pixels and chromatic pixels. Here, pixels that have been divided by borderlines 54 in FIGS. 5(a)-6(b) are pixels that have been targeted for the bleed suppression process. The borderlines 54 do not constitute part of the image being processed.

When the image shown in FIG. 5(a) is subjected to the print control process of FIG. 4, the PC 10 sets only the black pixels arranged within a two-pixel range from the boundary between the solid black elements 50 and solid chromatic elements 52 as target pixels for the bleed suppression process and executes the bleed suppression process on these pixels. Interior pixels of the solid black elements 50 are not subjected to the bleed suppression process since these pixels do not meet the condition of "having a black gradation level that changes discontinuously between the reference pixel and a chromatic pixel within a two-pixel range." In other words, none of these interior pixels have a gradation level of black that differs discontinuously from a separate pixel within two pixels thereof.

Therefore, the PC 10 does not attempt to suppress bleeding in all solid black elements 50 for the image printed on the printer 40, but suppresses bleeding only in regions constituting the border of the solid black elements 50. Accordingly, the PC 10 can eliminate noticeable bleeding of black ink into the solid chromatic elements 52 while avoiding a drop in pixel density.

Although the bleed suppression process of S108 will be described later in greater detail with reference to FIGS. 7 and 8, the function of this process is to reduce the black component value K in the target pixels while increasing the values of the chromatic components. In other words, the PC 10 reduces the probability that black ink will be printed on the recording paper for pixels corresponding to the pixels targeted in the bleed suppression process, while increasing the probability that chromatic ink will be printed for the same pixels. Thus, even when black ink is printed in pixels corresponding to the pixels targeted for the bleed suppression process, the black ink will blend with chromatic ink printed in the same pixel while being inhibited from bleeding into neighboring chromatic pixels. In other words, the chromatic ink printed in the same pixel as black ink functions as a wall for preventing this black ink from bleeding into other elements.

Figure 5B:
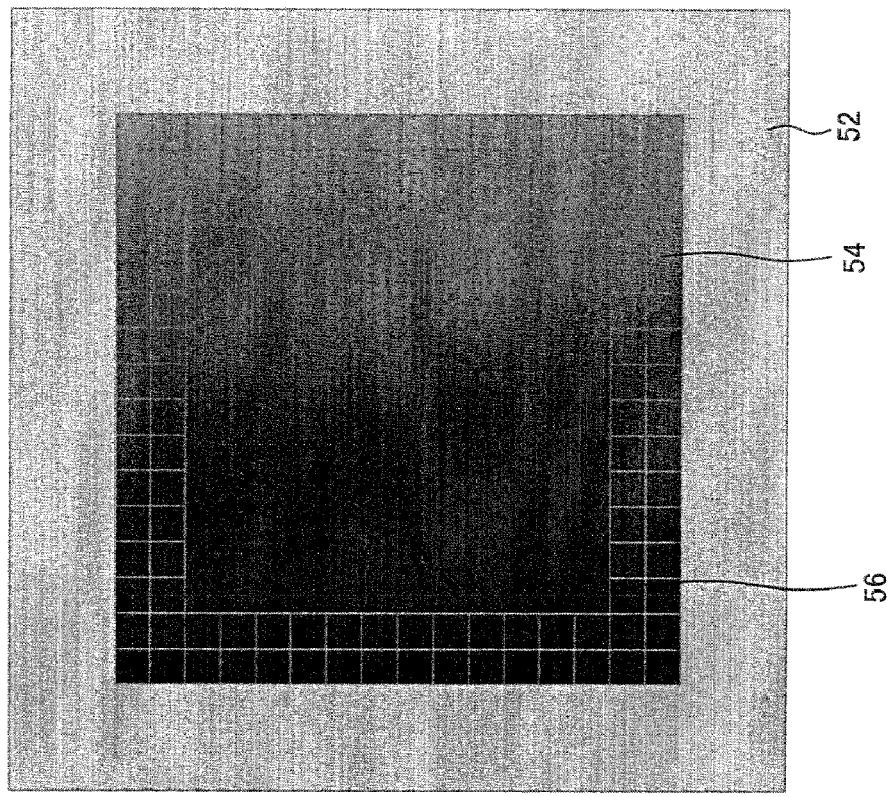
FIG. 5(b) shows an example of black gradation elements including black pixels that are arranged on a background configured of solid chromatic elements.
Figure 5A:
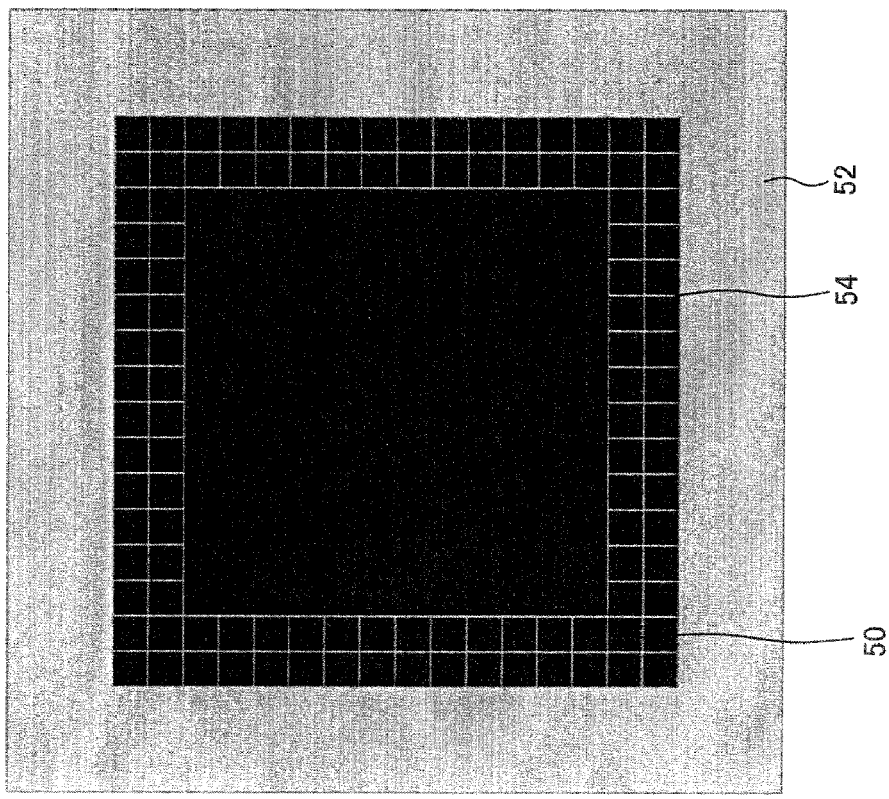
FIG. 5(a) shows an example of solid black elements configured of black pixels having a uniform black component value K that are arranged on a background of solid chromatic elements.

FIG. 5(b) shows an example of black gradation elements 56 including black pixels that are arranged on a background configured of the solid chromatic elements 52. A supplementary description is needed here, since the diagrams are depicted in monochrome. The black gradation elements 56 are black pixels having black component values of 64 or greater. The black pixels positioned on the left side in FIG. 5(b) have the highest density, and the densities of the black pixels decrease toward the right. At the same time, the densities of the chromatic colors increase toward the right.

In this example, most of the pixels constituting the black gradation elements 56 are black pixels and meet the condition of having a chromatic pixel representing a chromatic color that is located within two pixels from the reference black pixel. In a conceivable case where the PC determines which of these black pixels to subject to the bleed suppression process without adding the condition of "having a black gradation level that changes discontinuously between the reference pixel and any chromatic pixel within two pixels thereof," most of the pixels in the black gradation elements 56 would be subjected to the bleed suppression process, potentially dropping the overall density of the black gradation elements and resulting in an unsatisfactory image. This occurs because the amount of black ink used to print the black gradation elements (the occurrence rate of black dots) is decreased when decreasing the black component value K in the bleed suppression process. Accordingly, the density of black is reduced, even though the occurrence rate of chromatic dots is increased. Moreover, there is little need to execute the bleed suppression process on interior pixels of the black gradation elements 56 since the phenomenon of black ink bleeding into chromatic ink is relatively unnoticeable in this region.

On the other hand, according to the print control process (FIG. 4) of the embodiment, interior pixels of the solid black elements 56 are not subjected to the bleed suppression process since these pixels do not meet the condition of "having a black gradation level that changes discontinuously between the reference pixel and a chromatic pixel within a two-pixel range." In other words, none of these interior pixels have a gradation level of black that differs discontinuously from a separate pixel within two pixels thereof. Therefore, the PC 10 can suppress a drop in black density in the black gradation elements 56 while suppressing the bleeding of black ink into chromatic ink.

FIG. 6(a) shows an example of nonuniform black elements 58 including black pixels that are arranged on a background configured of the solid chromatic elements 52. Since the pixels constituting the nonuniform black elements 58 include the chromatic color components of the solid chromatic elements 52 forming the background, these pixels are both black pixels and chromatic pixels and have varied densities of black.

According to the print control process (FIG. 4) of the embodiment, interior pixels of the nonuniform black elements 58 are not subjected to the bleed suppression process since these pixels do not meet the condition of "having the black gradation level that changes discontinuously between the reference pixel and a chromatic pixel within a two-pixel range." In other words, none of these interior pixels have the gradation level of black that differs discontinuously from a separate pixel within two pixels thereof. Therefore, the PC 10 can suppress a drop in black density in the nonuniform black elements 58 while suppressing the bleeding of black ink into chromatic ink.

FIG. 6(b) shows an example of solid dark black elements 60 and solid light black elements 62 arranged adjacent to each other on a background configured of the solid chromatic elements 52. Since the pixels constituting the solid black elements 60 and 62 include the chromatic color components of the solid chromatic elements 52 forming the background, these pixels are both black pixels and chromatic pixels.

When the PC 10 determines that the gradation level of black changes discontinuously between the solid dark black elements 60 and the solid light black elements 62 in the print control process of the embodiment, the PC 10 sets pixels constituting the border between the solid dark black elements 60 and the solid light black elements 62 as target pixels for the bleed suppression process. On the other hand, when the PC 10 determines that the black gradation level changes continuously between the solid dark black elements 60 and solid light black elements 62 (i.e., when the difference between the black components K is less than the threshold $K_{TH2}$), this pixel is not subjected to the bleed suppression process because any bleeding that occurs between the solid black elements 60 and 62 is not likely noticeable since the gradation level of black changes continuously.

In the example shown in FIG. 6(b), pixels on both sides of the boundary between the solid black elements 60 and 62 are set as target pixels for the bleed suppression process, but the PC 10 may be configured to set only pixels on one side of the boundary as target pixels for the bleed suppression process because bleeding can still be made unnoticeable to a degree by performing the bleed suppression process on only one side of a boundary.

For example, in S107 of the print control process described above, the PC 10 determines whether the gradation level of black changes discontinuously between the reference pixel P(i,j) and the peripheral pixel S(k,l) based on whether the absolute value of the difference between black components |[P(i,j)_K]−[S(k,l)_K]| is greater than or equal to a predetermined threshold $K_{TH2}$, such as 64. However, the PC 10 may determine whether the result of the above computation prior to taking the absolute value is greater than or equal to the threshold $K_{TH1}$. That is, the PC 10 determines whether the value [P(i,j)_K]−[S(k,l)_K] is greater than or equal to a predetermined threshold value $K_{TH2}$. In this way, only pixels on the side with dark black will be subjected to the bleed suppression process when a boundary separates dark black pixels from the light black pixels.

Next, the bleed suppression process will be described with reference to FIGS. 7 and 8. FIG. 7 is a flowchart illustrating steps in the bleed suppression process of S108 in the print control process. In S702 of the bleed suppression process, the CPU 11 reduces the black component value K of the target pixel to the corresponding black component value K' by referencing the black component correction value table 17b (see FIG. 2).

In S704 the CPU 11 subtracts the black component value K' from the black component value K and sets this difference as a first black substitution value D1. Thus, a larger value is acquired as the first black substitution value D1 for a larger difference between the black component value K and black component value K' (see FIG. 8).

In S706 the CPU 11 acquires a second black substitution value D2. The second black substitution value D2 is obtained by subtracting the largest chromatic component value in the target pixel (expressed as "MAX (C, M, Y)" in FIG. 7) from the maximum possible value that can be set for the chromatic component (255, for example; see FIG. 8).

In S708 the CPU 11 determines whether the second black substitution value D2 is greater than or equal to the first black substitution value D1. If the second black substitution value D2 is greater than or equal to the first black substitution value D1 (S708: YES), in S710 the CPU 11 adds the first black substitution value D1 to each of the cyan, magenta, and yellow component values in the target pixel, and subsequently ends the process (see FIG. 8(a)).

However, if the second black substitution value D2 is less than the first black substitution value D1 (S708: NO), in S712 the CPU 11 adds the second black substitution value D2 to each of the cyan, magenta, and yellow component values of the target pixel, and subsequently ends the process (see FIG. 8(b)).

By S710 or S712, the CPU 11 increases each chromatic component value by an amount determined dependently on at least one of the black component value and the chromatic component value of the reference pixel subject to the bleed suppression process. Further, the CPU 11 obtains the increased chromatic component values of the reference pixel subject to the bleed suppression process by adding, to the chromatic component values of the reference pixel, values that are equal to one another.

Figure 8A:
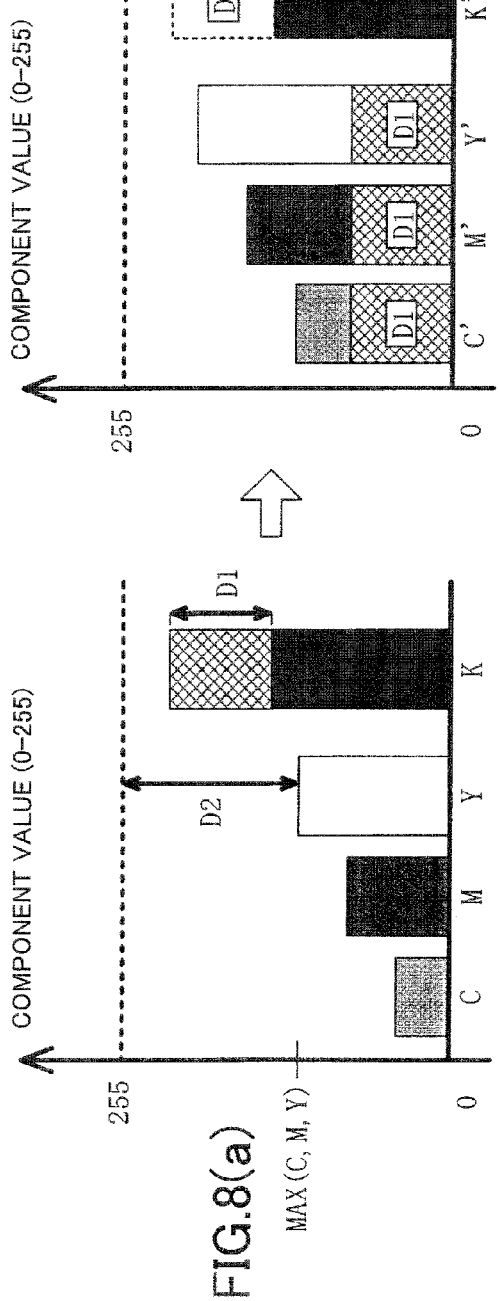
FIG. 8(a) illustrates a case in which a first black substitution value D1 is less than a second black substitution value D2.
Figure 8B:
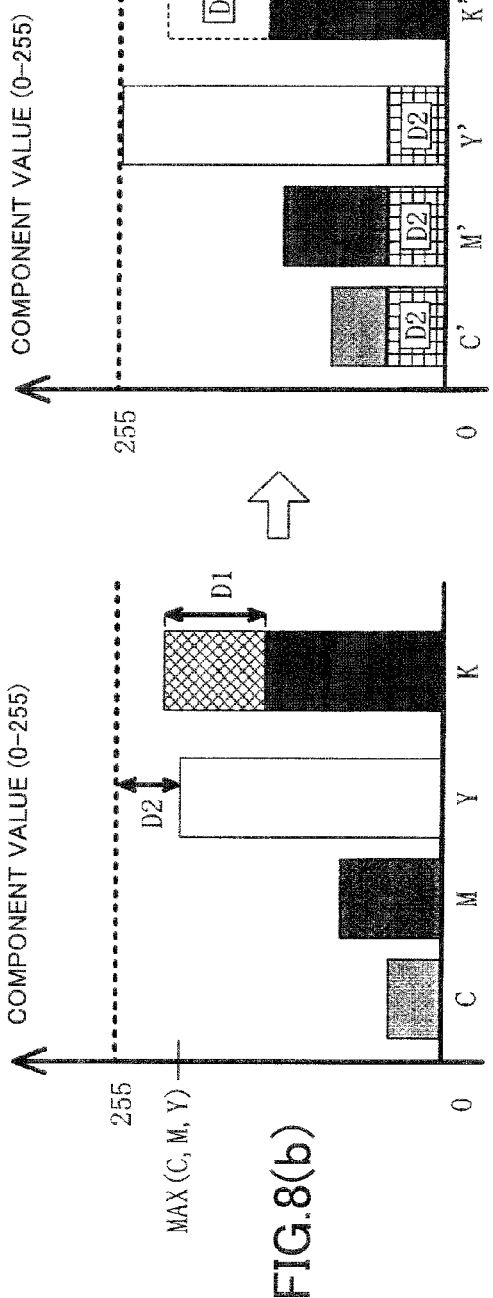
FIG. 8(b) illustrates an example in which the first black substitution value D1 is greater than the second black substitution value D2.

FIGS. 8(a), 8(b) are a bar graph showing relationships between the first black substitution value D1 and the second black substitution value D2 in order to illustrate the bleed suppression process. FIG. 8(a) illustrates a case in which the first black substitution value D1 is less than the second black substitution value D2 (255—the yellow component value Y in this example).

As shown in FIG. 8(a), the PC 10 adds the first black substitution value D1 to each of the chromatic components of the target pixel in the bleed suppression process of the embodiment. Consequently, larger values are added to each chromatic component of the target pixel when the amount of reduction in the black component value K is larger in order to suppress a drop in the density of black caused by reducing the black component value K.

As described earlier with reference to FIG. 2, the difference between the black component value K and the black component value K' increases for larger values of the original black component value K in the target pixel (a larger density of black expressed by the target pixel) and, thus, the value added to the chromatic components (first black substitution value D1) in the bleed suppression process also increases. Put another way, the probability of chromatic ink being printed on the recording paper for a pixel corresponding to a target pixel increases as the original black component value K for the target pixel increases. Accordingly, a larger amount of chromatic ink is printed in a region of the recording paper having a cluster of such pixels.

As described above, when chromatic ink and black ink are printed on recording paper for the same pixel, the chromatic ink functions as a wall for inhibiting the black ink in the same pixel from bleeding into other pixels. Further, the chromatic ink prohibits the black ink in separate black pixels adjacent to this pixel from bleeding into this pixel. A greater bleed suppression effect can be achieved by printing larger quantities of chromatic ink in regions of the recording paper corresponding to dark black regions formed by a cluster of target pixels whose original K values are large. As a result, a darker black color can be rendered using a larger amount of black ink.

The first black substitution value D1 is added to each chromatic component in the bleed suppression process of the embodiment if the second black substitution value D2 is greater than or equal to the first black substitution value D1. Thus, the PC 10 can prevent the resulting chromatic components from being larger than the maximum possible value for such chromatic components. This is important because, if the value of a chromatic component resulting from the addition of the first black substitution value D1 exceeds the maximum value possible for that chromatic component, the PC 10 must perform a step to eliminate the excess amount, resulting in a color imbalance.

FIG. 8(b) illustrates an example in which the first black substitution value D1 is greater than the second black substitution value D2. As illustrated in FIG. 8(b), the second black substitution value D2 is added to each of the chromatic components of the target pixel in the bleed suppression process of the embodiment. Accordingly, the values of the chromatic components do not exceed their maximum values (255 in the embodiment).

In this way, the PC 10 adds the largest possible value (the second black substitution value D2) to the chromatic components when the first black substitution value D1 is too large to be added, thereby setting the chromatic components of the target pixel to their largest possible values. As a result, the PC 10 suppresses a loss in black density occurring in pixels printed on the paper that correspond to the target pixels by using the largest possible amount of chromatic ink.

Further, whether adding the first black substitution value D1, as illustrated in FIG. 8(a), or the second black substitution value D2, as illustrated in FIG. 8(b), the PC 10 always adds the same black substitution value to each of the chromatic components in the target pixels. Accordingly, the bleed suppression process of the embodiment does not create a color imbalance in the plurality of chromatic colors set for each target pixel.

While the invention has been described in detail with reference to the embodiment thereof, it would be apparent to those skilled in the art that various changes and modifications may be made therein without departing from the spirit of the invention.

For example, while the threshold $K_{TH1}$ used for determining whether a pixel is a black pixel are the same with the threshold $K_{TH2}$ used for determining changes in black gradation level in the print control process of the embodiment, these threshold values may be different from each other.

Figure 7:
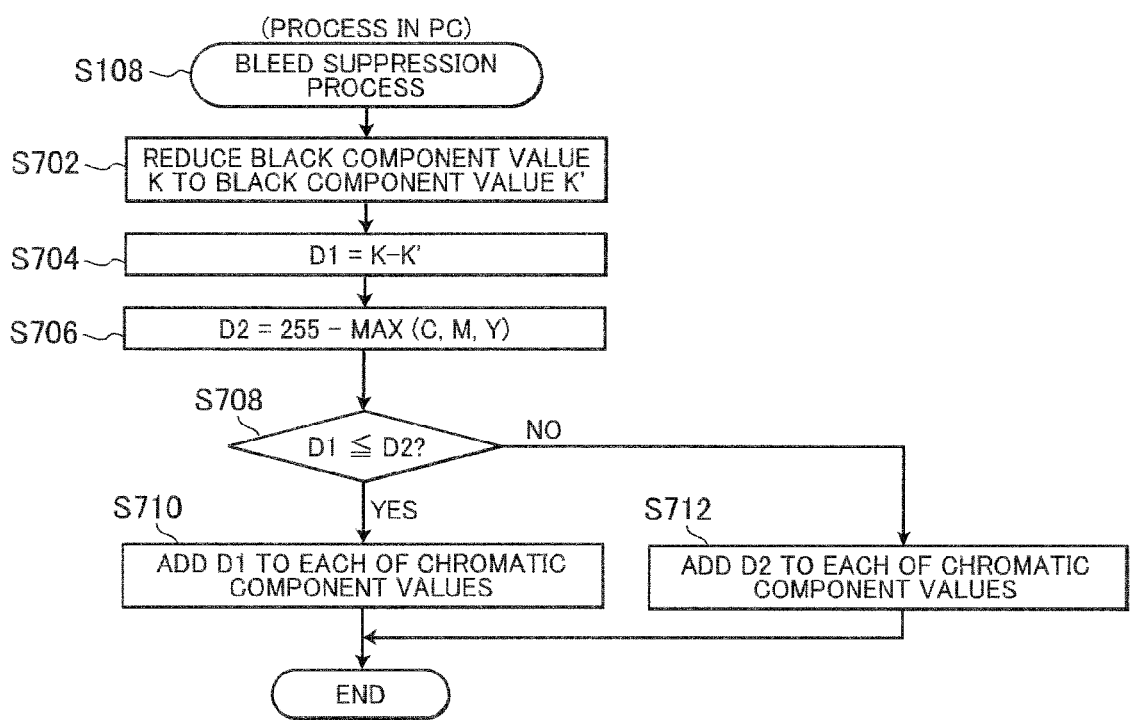
FIG. 7 is a flowchart illustrating steps in the bleed suppression process in the print control process.

Further, the PC 10 compares the first black substitution value D1 to the second black substitution value D2 in the bleed suppression process of the embodiment and adds the second black substitution value D2 to chromatic components in the target pixel when the second black substitution value D2 is less than the first black substitution value D1 (S708 of FIG. 7). However, the PC 10 may skip this determination in S708 and simply add the second black substitution value D2 at all times. This method ensures that the largest possible amount of chromatic ink is used when printing a region of the recording paper corresponding to a region in which a plurality of target pixels are clustered together, thereby suppressing a drop in black density.

In the bleed suppression process of the embodiment described above, the same value is added to each of the plurality of values of chromatic components in the target pixel. However, it is possible to calculate values to be added to the values of the chromatic components based on the proportions of the values of the original chromatic components or a predetermined percentage for each color. For example, the PC 10 may add a larger value to the values of the chromatic components having a larger original value and a smaller value to the values of the chromatic components having a smaller original value, thereby maintaining the color balance of the target pixel.

Further, while the black component correction value table 17b (see FIG. 2) is used to determine the black component value K' in the bleed suppression process of the embodiment, the black component value K' may be calculated using Equation (1) given above.

Further, while the PC 10 executes the print control process shown in FIG. 4 in the embodiment described above, this print control process may be executed by the CPU 41 of the printer 40 or an ASIC (not shown) provided in the printer 40, for example.

What is claimed is:

1. A print controller controlling a print process in which black ink having permeability to a recording medium and chromatic color ink having permeability to the recording medium different from the permeability of the black ink are used to form an image on the recording medium, the print controller comprising:
an acquiring unit that acquires image data having a plurality of sets of pixel data, the image data representing an image including pixels, each set of pixel data corresponding to one pixel and indicating a gradation level;
a subject pixel setting unit that sets, as a subject pixel, one pixel that is in the image and that satisfies a first condition that the pixel is a black pixel expressing black, a second condition that a plurality of peripheral pixels that are located adjacent to the pixel and that surround the pixel include at least one chromatic pixel expressing chromatic color, and a third condition that the gradation level of black changes discontinuously between the pixel and at least one of the at least one chromatic pixel, a discontinuous change in the gradation level of black being defined by a difference between a black component value of the pixel and a black component value of the at least one of the at least one chromatic pixel is greater than or equal to a predetermined first value; and
a bleed suppressing unit that executes a bleed suppression process to a set of pixel data corresponding to the subject pixel to suppress bleeding of the black ink on the recording medium only when the set of pixel data corresponding to the subject pixel satisfies all of the first condition, the second condition, and the third condition.

2. The print controller according to claim 1, wherein each set of pixel data in the image data has a black component value and a chromatic component value, the black component value expressing one of multiple gradation levels of black, the chromatic component value expressing one of multiple gradation levels of a chromatic color,
wherein the bleed suppressing unit reduces the black component value of the subject pixel and increases the chromatic component value of the subject pixel.

3. The print controller according to claim 2, wherein the subject pixel setting unit sets, as subject pixels, all of pixels, each of which is in the image and that satisfies all of the first through third conditions,
the print controller further comprising a halftone process unit that performs a halftone process on the image data after the bleed suppressing unit executes the bleed suppression process to sets of pixel data corresponding to all the subject pixels that are set by the subject pixel setting unit, the halftone process unit binarizing each of the black component value and the chromatic component value to either one of an ON value indicating that a dot is formed and an OFF value indicating that a dot is not formed.

4. The print controller according to claim 2, further comprising:
a pixel selecting unit that selects one pixel among the pixels in the image;
a black pixel determining unit that determines whether the selected pixel is a black pixel expressing black;
a chromatic pixel determining unit that, when the black pixel determining unit determines that the selected pixel is a black pixel, determines whether a plurality of peripheral pixels that are located adjacent to the selected pixel and that surround the selected pixel include at least one chromatic pixel expressing chromatic color; and
a gradation determining unit that, when the chromatic pixel determining unit determines that the plurality of peripheral pixels include at least one chromatic pixel, determines whether the gradation level of black changes discontinuously between the selected pixel and at least one of the at least one chromatic pixel.

5. The print controller according to claim 4, wherein the gradation determining unit determines that the gradation level of black changes discontinuously between the selected pixel and at least one of the at least one chromatic pixel.

6. The print controller according to claim 5, wherein the chromatic pixel determining unit judges whether the chromatic component value of each of the peripheral pixels is greater than or equal to a predetermined second value, and determines that one peripheral pixel is a chromatic pixel when the chromatic component value of the peripheral pixel is greater than or equal to the predetermined second value.

7. The print controller according to claim 6, wherein the black pixel determining unit judges whether a black component of the selected pixel is greater than or equal to a predetermined third value, and determines that the selected pixel is a black pixel when the black component of the subject pixel is greater than or equal to the predetermined third value.

8. The print controller according to claim 5, wherein the pixels in the image are arranged in a horizontal direction and a vertical direction, wherein the subject pixel setting unit further comprises a peripheral pixel extracting unit that extracts, as the plurality of peripheral pixels, 24 pixels that are located surrounding the selected pixel and that are separate from the selected pixel by a distance smaller than or equal to two pixels' worth of distance in at least one of the horizontal direction and the vertical direction.

9. A non-transitory computer readable storage medium storing a set of program instructions executable by a computer for controlling a print process in which black ink having permeability to a recording medium and chromatic color ink having permeability to the recording medium different from the permeability of the black ink are used to form an image on the recording medium, the program instructions comprising:

acquiring image data having a plurality of sets of pixel data, the image data representing an image including pixels, each set of pixel data corresponding to one pixel and indicating a gradation level;

setting, as a subject pixel, one pixel that is in the image and that satisfies a first condition that the pixel is a black pixel expressing black, a second condition that a plurality of peripheral pixels that are located adjacent to the pixel and that surround the pixel include at least one chromatic pixel expressing chromatic color, and a third condition that the gradation level of black changes discontinuously between the pixel and at least one of the at least one chromatic pixel, a discontinuous change in the gradation level of black being defined by a difference between a black component value of the pixel and a black component value of the at least one of the at least one chromatic pixel is greater than or equal to a predetermined first value; and executing a bleed suppression process to a set of pixel data corresponding to the subject pixel to suppress bleeding of the black ink on the recording medium only when the set of pixel data corresponding to the subject pixel satisfied all of the first condition, the second condition, and the third condition.

\* \* \* \* \*